United States Patent [19]
Hoadley

[11] 3,802,476
[45] Apr. 9, 1974

[54] SCREW ANCHOR
[75] Inventor: James E. Hoadley, Palatine, Ill.
[73] Assignee: Illinois Tool Works Inc., Chicago, Ill.
[22] Filed: May 8, 1972
[21] Appl. No.: 250,902

[52] U.S. Cl............................... 151/41.7, 85/32 V
[51] Int. Cl............................................. F16b 39/00
[58] Field of Search .......... 151/41.7, 41.72; 52/704; 85/32 V, 1 JP, 32 R, 50 R

[56] References Cited
UNITED STATES PATENTS
2,383,133  8/1945  Kost............................... 85/32 V X
3,131,742  5/1964  Munse........................... 85/32 V X
3,298,271  1/1967  Krueger............................ 85/32 R
3,392,225  7/1968  Phelan............................. 151/41.7
3,453,796  7/1969  Gutmann............................. 52/704
3,570,361  3/1971  Tinnerman........................ 85/32 V FOREIGN PATENTS OR APPLICATIONS
1,085,387  9/1967  Great Britain..................... 151/41.7

Primary Examiner—Ramon S. Britts
Attorney, Agent, or Firm—J. R. Halvorsen; Robert W. Beart

[57] ABSTRACT

A screw anchoring device for pre-assembled sealing attachment over an aperture in a wall surface panel, such as a plastic liner wall of a refrigerator, which, in turn, is to be attached to an outer cabinet wall with the space between the walls to be filled with an insulating material as, for example, a foamed in situ plastic material; the anchoring device including a plate portion with a helical screw impression and struck tabs piercing an attached double faced adhesive pad for mounting the device to the adjacent wall surface in position to seal the aperture therethrough with the screw impression in position to receive a screw passed through the adhesive pad for mounting various types of utility components to the accessible face of the liner wall, and the plate portion of the anchoring device having angled edge portion to facilitate initial handling and subsequent embedment in the foamed insulating material.

4 Claims, 5 Drawing Figures

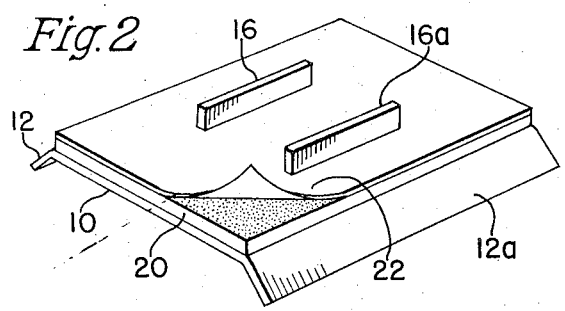
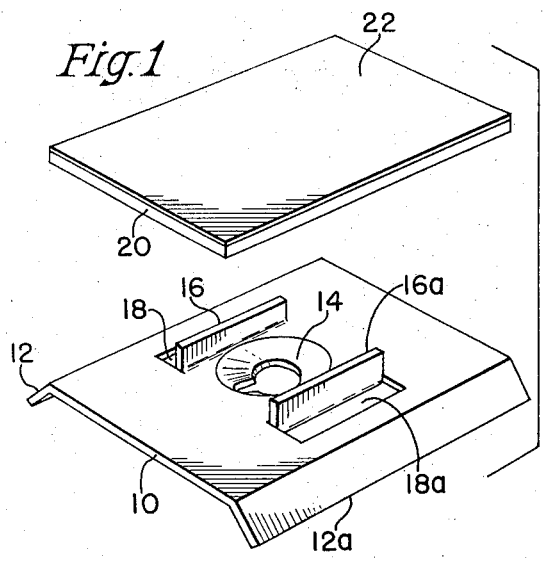
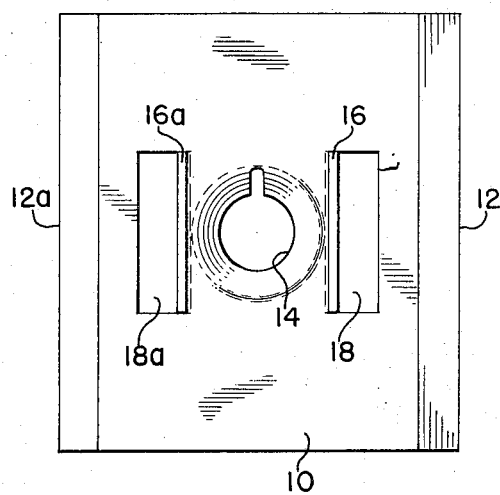
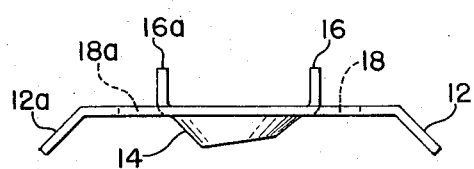
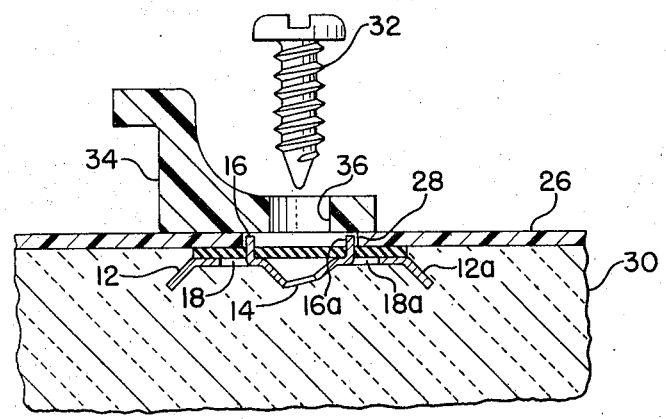

SCREW ANCHOR

This invention is concerned with the provision of a screw anchoring device to be pre-assembled with an apertured wall for subsequent reception of a screw or the like through the aperture for mounting any one of a variety of utility components to the exposed side of the wall surface in the finished structure which, for example, may be a refrigerator in which the apertured wall constitutes the liner wall attached to an outer cabinet wall structure with the space between the walls filled with an insulating material which may be foamed in situ. In many such assemblies, the insulating material is foamed in place between imperforate wall surfaces and the liner wall subsequently apertured for reception of split type snap-in grommets for component mounting or the components may be mounted by self-tapping screw elements or the like.

An object of the present invention is to provide an anchoring device for a screw or other type fastener wherein the anchoring device includes a plate portion which may be pre-assembled to one side of an apertured panel sealing the aperture therethrough against egress of material, as for example, foamed material applied to that side of the panel.

Another object of the invention is to provide such an anchoring device with a helical screw impression in the plate portion and means for properly locating the same with respect to the panel aperture to be sealed for subsequent reception of a screw fastener.

A further object of the invention is to provide an anchoring device substantially of the above type with the plate portion carrying an adhesive layered pad for sealing the panel aperture with an exposed adhesive layer serving to mount the device to the panel and also closing off the screw impression prior to association of a screw element therewith.

The invention still further aims to provide an anchoring device having tabs struck from the plate portion at opposite sides of the screw impression and serving as a convenience in the method of assembly by pressure application between the plate portion and adhesive pad causing the tabs to penetrate the pad which then seals the helical impression and resultant apertures in the plate portion, as well as the panel aperture, against egress of material applied to that side of the panel.

In the accompanying drawing:

FIG. 1 is an exploded view of the adhesive layered pad and the plate member prior to assembly thereof;

FIG. 2 is a perspective view of the assembled plate and adhesive pad;

FIG. 3 is an enlarged plan view of the plate member;

FIG. 4 is an end elevation of FIG. 3; and

FIG. 5 is a sectional view showing the anchoring device assembled to a surface of the apertured panel with the foamed material applied to that surface and sealed against egress through the panel aperture, and further showing location of a utility component on the opposite surface of the panel in position to be attached thereto upon insertion of the illustrated screw element.

With reference to FIGS. 2, 3 and 4 of the drawing, the plate member 10 may be of any desired shape but is shown as somewhat rectangular with angled wing portions 12, 12a along opposite edges thereof. The plate member has a central aperture around which there is provided a helical screw impression 14. At opposite sides of the screw impression, there are provided tab members 16, 16a struck from the material of the plate member in opposite direction to that of the wing portions 12, 12a and leaving openings 18, 18a in the plate member.

With reference to FIGS. 1 and 2, the pad 20 is of the type presenting oppositely faced pressure sensitive adhesive surfaces which may be initially protected by removable paper covers, such as at 22 on the outer surface thereof. The adhesive pad may be assembled to the tab side of the plate member by suitable pressure means, as by a suitably configured pressure plate or roller, to cause the tabs 16, 16a to penetrate the pad and cover 22 with the under adhesive surface of the pad adhering to the adjacent surface of the plate member in position, as shown in FIG. 1, with the pad covering the openings 18, 18a and the screw impression 14, and with the tabs 16, 16a projecting from the opposite adhesive surface of the pad from which the cover 22 has been removed.

The assembled anchoring device of FIG. 1 can then be applied to surface of a panel 26 as shown in FIG. 5. Such a panel will have a predetermined pattern of apertures formed therethrough depending upon the ultimate type of structure in which the panel is to be incorporated. Using a refrigerator cabinet as an example, the apertures in the panel will be selectively located to provide for shelving or shelf supports, freezer unit supports and the like utility components. In FIG. 5, there is shown one such panel aperture 28 which may assume various configurations. Prior to application of the insulating material 30, the anchoring device is applied to the surface of the panel 26 which may be a liner for a refrigerator by adhering the outer adjesive surface of the pad 20 thereto with the tabs 16, 16a extending into the panel aperture 28. If the panel aperture is squared or rectangular, these elongate tabs serve to properly locate the device relative to the aperture to prevent relative rotation and may assume various dimensions and spacings depending upon the size of aperture and thickness of the liner panel. If round panel apertures are employed, the tabs may be reduced in length to mere pin-like projections properly spaced for locating the anchoring device relative to the panel aperture with the adhesive layer preventing relative rotation. It will be seen that the adhesive pad 20 seals the openings 18, 18a resulting from the struck out tabs 16, 16a; and the pad also seals off the screw impression aperture as well as the aperture 28 in the panel. The pad also seals along the surfaces of the tabs projecting therethrough. The wing portions 12, 12a serve as convenient finger grip surfaces for facilitating initial placement of the anchoring device on the panel surface in proper position with the tabs projecting into the panel aperture. When so assembled to the panel or liner surface, an outer cabinet wall or other structure may be assembled with the panel or liner to provide a space therebetween and in which the insulating material 30 may be placed, as by pouring or foaming in situ. The panel aperture 28 is sealed against escape of the material and the wing portions 12, 12a dovetail with the material as does the screw impression 14 so as to further lock the anchoring device in position and against rotation upon application of a screw 32 to the helical impression 14.

After the material 30 is set up, a utility component 34 is located on the accessible face of the panel with its aperture 36 aligned with the panel aperture 28. Thus, the screw 32 may be passed through the aligned apertures to puncture the pad 20 and be forced through a material which may have flowed through the screw impression and then threaded into engagement with the screw impression surface and tightened to effectively mount the component 34 to the exposed surface of the panel or liner as the case may be. After the screw is threaded home, it will serve as a further interlock with the material 30 to add to the strength and rigidity of the supported utility component 34 which may have a hooked end 38 as a shelf support, or other configuration, as indicated heretofore. Also as previously indicated, the material 30 may be confined within various types of an outer wall structure.

I claim:

1. A screw anchoring device for pre-assembled aperture sealing attachment with an apertured panel to confine material, such as insulating material foamed in place between the panel and an attached spaced wall or other structure; and comprising a plate member having a central aperture forming a helical screw receiving impression and a generally flat portion, a pair of upstanding tabs projecting from one face of the generally flat portion of said plate member at opposite sides of and adjacent to said screw impression, said tabs being struck from within the margins of said plate member, and a continuous pad of a material capable of being penetrated by said screw and having an exposable adhesive surface substantially covering and carried by the plate member with the tabs projecting for entry into the panel aperture and through said pad to locate the anchoring device and with the adhesive surface of the pad extending across the panel aperture for mounting and sealing adherence to the adjacent panel surface whereby to prevent egress of trapped material through the panel aperture, and with the screw impression in position for threaded engagement with a screw passed through the panel aperture and the pad for attachment of a utility component to the opposite panel surface and one or more wing portions formed from said plate member at one or more edges of said flat portion of said plate member, said wing portions being angled away from the face thereof opposite to that of the tabs and adapted to be embedded in the foamed material for supplementing the other anti-rotative features of the anchor.

2. An anchoring device as claimed in claim 1, wherein the adhesive pad is double faced for attachment to the plate member and to the panel surface.

3. An anchoring device as claimed in claim 1, wherein the pad and the adhesive layers thereof will seal along the surface of a screw engaged with the helical screw impression.

4. An anchoring device as claimed in claim 1 wherein in said device said pair of tabs are of rectangular shape and said wings are two in number and have a rectangular shape with the long sides of said rectangular tabs and said rectangular wings are all aligned in substantially parallel relationship.

* * * * *